United States Patent
Bhogal et al.

(10) Patent No.: US 6,629,197 B1
(45) Date of Patent: Sep. 30, 2003

(54) METHOD AND SYSTEM FOR STORING DIGITAL AUDIO DATA AND EMULATING MULTIPLE CD-CHANGER UNITS

(75) Inventors: Kulvir Singh Bhogal, Austin, TX (US); Nizamudeen Ishmael, Jr., Austin, TX (US); Baljeet Singh Baweja, Austin, TX (US); Mandeep Sidhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/704,570

(22) Filed: Nov. 3, 2000

(51) Int. Cl.[7] .............................................. G06F 12/00
(52) U.S. Cl. ........................ 711/111; 711/163; 711/164; 369/2; 369/6; 709/219; 703/24
(58) Field of Search ................................ 369/1, 2, 6, 7; 703/24, 25; 711/111, 163, 164; 709/219

(56) References Cited

U.S. PATENT DOCUMENTS

| | | | |
|---|---|---|---|
| 5,131,089 A | * 7/1992 | Cole | 703/24 |
| 5,161,131 A | 11/1992 | Borchardt et al. | 369/1 |
| 5,235,568 A | 8/1993 | Masaru | 369/2 |
| 5,253,218 A | * 10/1993 | Suzuki | 369/75.1 |
| 5,339,362 A | * 8/1994 | Harris | 381/86 |
| 5,457,677 A | * 10/1995 | Yamashita et al. | 369/289 |
| 5,473,765 A | * 12/1995 | Gibbons et al. | 703/24 |
| 5,475,836 A | * 12/1995 | Harris et al. | 703/24 X |
| 5,633,843 A | * 5/1997 | Gupta et al. | 369/32 |
| 5,640,592 A | * 6/1997 | Rao | 395/825 |
| 5,790,481 A | 8/1998 | Meitner | 369/2 |
| 5,794,013 A | * 8/1998 | McBrearty | 395/500 |
| 6,011,741 A | * 1/2000 | Wallace et al. | 365/221 |
| 6,028,996 A | * 2/2000 | Sniderman et al. | 703/28 |
| 6,035,116 A | * 3/2000 | Terada et al. | 703/24 |
| 6,041,023 A | 3/2000 | Lakhansingh | 369/7 |
| 6,055,478 A | * 4/2000 | Heron | 701/213 |
| 6,061,306 A | 5/2000 | Buchheim | 369/2 |
| 6,117,186 A | * 9/2000 | Wydall et al. | 717/9 |
| 6,137,047 A | * 10/2000 | Sugiyama | 84/626 |
| 6,137,677 A | * 10/2000 | Ganthier et al. | 361/683 |
| 6,182,242 B1 | * 1/2001 | Brogan et al. | 714/26 |

FOREIGN PATENT DOCUMENTS

| | | | |
|---|---|---|---|
| DE | 019546380 A1 | * 6/1996 | G06F/13/12 |
| DE | 29921681 | 12/1999 | |
| EP | 999549 A2 | 11/1999 | |
| JP | 403192426 A | * 8/1991 | G06F/3/06 |
| JP | 07271525 A | * 10/1995 | G06F/3/08 |
| WO | WO 00/11793 | 3/2000 | |

OTHER PUBLICATIONS

English translation of DE 19546380.*
"Audio Services Repair Forum—computer emulated cd changer", http://www.djcafe.com, Oct. 9, 1999.
"The KrazyKarl.com Car MP3 Player", http://www.krazykarl.com/mp3car, Aug. 18, 2000.
"Aiwa car CD–MP3 player", http://slashdot.org, May 6, 2000.
Moore, "How Do I Create a Streaming Audio Java Applet?", Dr. Dobb's Journal, v. 23, n. 5, pp. 122–124, May 1998.

* cited by examiner

*Primary Examiner*—Aristotelis M. Psitos
(74) *Attorney, Agent, or Firm*—Jeffrey S. LaBaw; Joseph R. Burwell

(57) ABSTRACT

A method for processing digital audio data is presented. A control signal for a CD-changer unit is received and interpreted by a digital audio unit that stores digital audio data/files and that determines a CD-changer unit operation that would be performed by the CD-changer unit in response to the CD-changer unit receiving the control signal. The digital audio unit then emulates the CD-changer unit operation. The CD-changer unit to be emulated by the digital audio unit can be selected. The digital audio data stored by the digital audio unit can be organized as virtual CD-ROMs. By emulating the operations of multiple types of CD-changer units, a single digital audio unit can be inserted in many different digital audio systems, thereby extending the functionality of a digital audio system to include storage of softcopy digital audio files that may be accessed through controls and commands for a CD-changer unit.

17 Claims, 3 Drawing Sheets

METHOD AND SYSTEM FOR STORING DIGITAL AUDIO DATA AND EMULATING MULTIPLE CD-CHANGER UNITS

BACKGROUND OF THE INVENTION

1. Field of the Invention

The present invention relates to an improved data processing system and, in particular, to a method and apparatus for enhancing storage and playback of digital audio data.

2. Description of Related Art

While portable CD players have been widely available for many years, other types of digital audio devices, applications, and services have recently become very popular. CD-ROM players are standard equipment on many personal computers, and many free or commercially available applications allow a user to record digital audio data from a CD onto the hard drive of a personal computer.

Internet connections have also become standard features on most home computers. With the expanding commercial uses of the Internet, many new applications and devices have been developed and are being developed that connect to the Internet and use the Internet in a variety of ways. With the increasing availability of broadband connections, many home computers now have the ability to transmit and receive large amounts of data with relative ease. As a consequence, large digital audio files are now commonly transmitted across the Internet. In addition, many software applications and services are available for allowing users to buy and/or share digital audio files.

As with many digital appliances and devices, portable digital audio devices have become Internet-enabled in some manner. Relatively inexpensive portable devices now provide the ability to store large amounts of digital audio data in standard or flash random access memory (RAM). Typically, the digital audio data has been downloaded from the Internet or recorded from a CD onto a hard drive of a personal computer, and the digital audio data is then transferred into the digital audio device or into a flash RAM component that is subsequently placed into the digital audio device.

Although other data formats are also popular, the most popular file format for digital audio data is MP3, a form of MPEG-3 compression and encoding. Hence, as shorthand or slang, many portable digital audio devices are known as MP3 players. MP3 files can be downloaded through the Internet and stored into an MP3 player.

With the popularity of the MP3 file format and other types of digital audio files, many traditional types of digital audio equipment are being enhanced to receive and store digital audio files. Home stereos and car stereos are now manufactured with the capability of either directly storing and playing digital audio files and/or interfacing with digital audio storage devices, such as MP3 players.

While many people have become accustomed to purchasing new digital devices with the newest capabilities, many people are disappointed with the trend of replacing devices that are otherwise fully functional except for the fact that the older devices do not have the newest functionality. For example, a user may own a relatively new car stereo system that contains a sophisticated CD changer unit with digital radio capability for so-called satellite broadcast, CD-quality radio. However, the user may now frequently use a newer portable digital audio device, such as an MP3 player, and because the car stereo system lacks an interface for the portable digital audio device, this user might become frustrated from the inability to play digital audio files through the car stereo system.

Essentially, the user is required to deal with digital audio files stored in different formats that can only be used on certain equipment. The user may continue to use CDs from a CD collection in a personal computer, home stereo, and car stereo. The user may also record digital audio files from a personal CD collection to create a digital audio file library, which is enhanced with files purchased or legally shared and downloaded from the Internet. The library of digital audio files might be archived on a personal computer, but these files can be temporarily copied to a portable digital audio device.

Once a user has built a personal digital audio file library, the user may become frustrated with the inability to playback digital audio files on certain equipment. For example, a user may be required to remember which digital audio files are owned only in a CD-ROM format. The user must then physically transfer CD-ROMs between locations when the user desires to playback the digital audio on these CDs in different locations. Data in hardcopy format, such as CDs, is becoming increasingly inconvenient in a computing environment in which devices are continually connected via the Internet and in which data can be easily transferred in softcopy format.

In order to reduce the number of times in which a user must physically transfer CDs to and from an audio system, many users have enhanced audio systems with a CD-changer unit that stores many audio CDs and that allows another piece of equipment in the audio system to control the CD-changer unit. In contrast to an audio unit that receives and plays a single CD, the CD-changer unit acts as a jukebox for storing, choosing, and playing many CDs. The user then has easy access to playing many CDs at any given time.

The CDs stored within a CD-changer unit, however, might represent only a small subset of the user's digital audio library. The user is still required to physically transfer the digital audio files in a physical medium, i.e. the CD-ROMs. When compared with the ease of transferring and using digital audio files in softcopy format with certain types of equipment, one can understand the inconvenience of continuing to use a CD library in hardcopy format. This is particularly frustrating given the widely held assumption that CDs were to be the ultimate format for storing and playing digital audio.

Currently owned audio equipment may be adequate except for the fact that the audio equipment does not have the ability to receive, store, or play digital audio files that are available only in softcopy format. Updating an audio system by replacing audio equipment in this situation seems expensive and unnecessary. Many audiophiles desire an alternative solution that allows them to keep their presently-owned audio equipment while updating the system with new functionality for receiving, storing, or playing digital audio files in softcopy format. This situation is particularly true for those persons who have previously purchased expensive CD-changer units that were widely regarded as necessary equipment for easy access to CDs.

Therefore, it would be advantageous to provide a system in which audio equipment can be enhanced with functionality for receiving, storing, or playing digital audio files in softcopy format. It would be particularly advantageous to augment an existing system containing a CD-changer unit with the desired functionality without having to physically modify the equipment in the existing audio system.

SUMMARY OF THE INVENTION

A method, an apparatus, a system, and a computer program product for processing digital audio data is presented. A control signal for a CD-changer unit is received and interpreted by a digital audio unit that stores digital audio data/files. The digital audio unit determines a CD-changer unit operation that would be performed by the CD-changer unit in response to the CD-changer unit receiving the control signal. The digital audio unit then emulates the CD-changer unit operation. The CD-changer unit to be emulated by the digital audio unit can be selected from a set of CD-changer units. In one case, the digital audio unit can detect a control signal for a CD-changer unit and then automatically select the type of CD-changer unit to be emulated based on the detected control signal. In a second case, the digital audio unit can receive a user selection for selecting a type of CD-changer unit to be emulated. The softcopy digital audio files stored within the digital audio unit are thereby accessed through the controls and commands for a CD-changer unit.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

Figure 1:
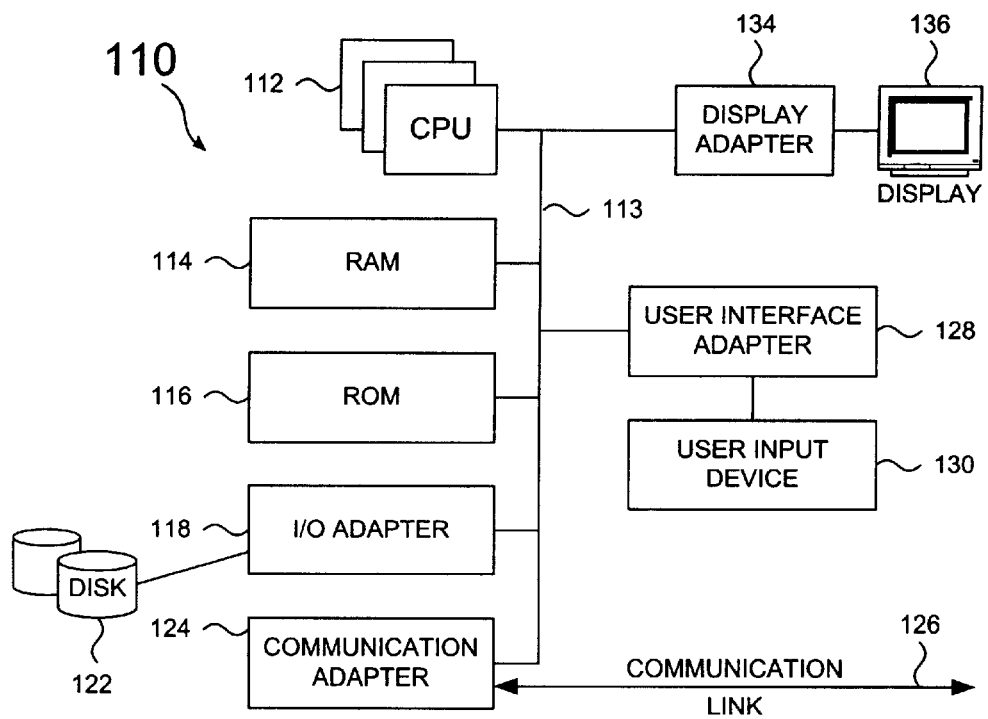
FIG. 1 depicts a computer architecture in which the present invention may be implemented.

With reference now to FIG. 1, a diagram depicts the architecture of a data processing system in which the present invention may be implemented. The present invention is a digital audio system that is preferably embodied in a mobile or portable package and has a basic computer architecture. Those of ordinary skill in the art will appreciate that the hardware in FIG. 1 may vary depending on the system implementation. For example, the system may have one or more processors, and other peripheral devices may be used in addition to or in place of the hardware depicted in FIG. 1. The depicted examples are not meant to imply architectural limitations with respect to the present invention. In addition to being able to be implemented on a variety of hardware platforms, the present invention may be implemented in a variety of software environments. A typical operating system or software runtime environment may be used to control program execution within the data processing system.

Data processing system 110 contains central processing unit (CPU) 112 connected to internal system bus 113, which interconnects random access memory (RAM) 114, read-only memory (ROM) 116, and input/output adapter 118, which supports various I/O devices, such as disk units 122 or other devices not shown. System bus 113 also connects communication adapter 124 that provides access to communication link 126. User interface adapter 128 connects various user devices, such as user input device 130, or other devices not shown, such as a touch screen, stylus, etc. Display adapter 134 connects system bus 113 to display device 136.

Since the data processing system is preferably embodied as a mobile unit, the internal components may be selected to enhance the mobility of the digital audio unit. ROM 116 may be a flash ROM so that is may be updated with new software and data, and RAM 114 may be expanded through the use of flash memory cards and other types of removable RAM. The system may contain additional processors, such as digital signal processors (DSPs). Disk storage unit 122 may be an IBM Microdrive™ unit that is capable of storing large amounts of digital audio data, other types of data, or software in a small form factor while being rugged enough for portable use. System 110 may be controlled through a software application executing on the personal computer to allow a user to select various modes of operation, to load data on the system. System 110 may also contain other types of digital stereo components, such as a digital radio tuner, digital satellite radio receiver, etc.

Communication adapter 124 may allow system 110 to be connected to a personal computer or other device for obtaining digital audio data and other types of data or for updating flash ROM. Communication adapter 124 may also include network support for connecting system 110 to a local area network or to the Internet. In addition, communication adapter 124 may support various types of wireless connections and personal area networks. It should also be noted that the other devices to which the portable digital audio device interfaces may have a similar computer architecture.

The present invention may be implemented on a variety of hardware and software platforms, as described above. More specifically, though, the present invention is directed to providing a digital audio device for interfacing with other audio devices and providing emulation of a CD-changer unit. The present invention may be used in a variety of digital audio applications and environments, such as a home stereo system or a car stereo system. However, for ease of presentation and to emphasize the necessity for mobile digital audio, the examples focus on a car stereo system that interfaces with a digital audio device containing the present invention. In addition, the present invention is preferably embodied in a portable digital audio device.

As noted above, many audiophiles desire an alternative for keeping their presently-owned audio equipment while updating the equipment with new functionality for receiving, storing, or playing digital audio files in softcopy format. This scenario is particularly true for those persons who have previously purchased expensive CD-changer units that were widely regarded as necessary equipment for easy access to a library of CDs.

Typically, CD-changer units and car stereo units are designed so that they are compatible only if they are made by the same manufacturer. In other words, CD-changers and car stereos usually have a proprietary interface, and no industry standard currently exists for interfacing different makes of CD-changers and car stereos.

By recognizing the demand for softcopy digital audio files and the issue of backward compatibility, the present invention takes advantage of the interface between stereo units and CD-changer units to implement a methodology for providing access to softcopy digital audio files. The present invention emulates the CD-changer interface, which is usually a hardwired interface for providing access to hardcopy digital audio files stored on CDs that are stored within the CD-changer, so that a stereo unit using the CD-changer interface can access softcopy digital audio files through its CD-changer interface. In addition, the present invention enables a CD-changer to "piggyback" on a digital audio device containing the present invention so that the current jukebox functionality of storing and accessing CDs within a CD-changer is still available.

Figure 2:
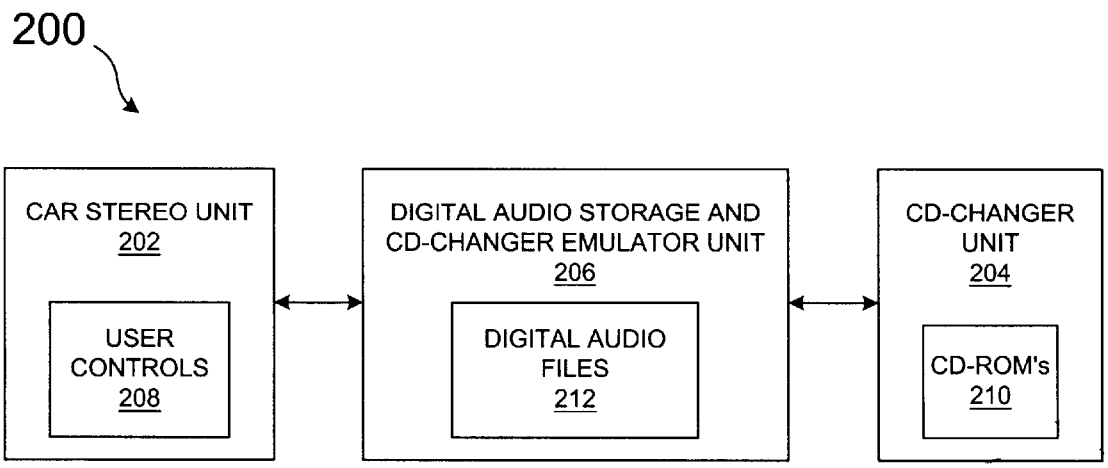
FIG. 2 is a block diagram depicting the relationship between the present invention and other components in an audio system.

With reference now to FIG. 2, a block diagram depicts the relationship between the present invention and other components in an audio system. System 200 shows a car stereo system containing car stereo unit 202, CD-changer unit 204, and digital audio storage and CD-changer emulator unit 206, hereinafter termed "emulator unit" for ease of reference. Car stereo unit 202 represents one or more stereo components, such as a tuner, CD-player, equalizer, etc., that may be found in the dashboard of a vehicle for easy access by a user. Car stereo unit 202, which can be understood as a type of base unit, is assumed to have user controls 208 for requesting the loading/unloading and playback of CDs stored within a CD-changer unit. Again, depending on the environment in which the present invention is deployed, other types of base units may be present, such as a home stereo unit and/or amplifier/integrator rather than a car stereo unit. User controls 208 may be physical controls, like push buttons and dials, or user controls 208 may be virtual controls presented within a graphical user interface.

CD-changer unit 204 represents a unit that stores and loads CD-ROMs 210 on command in a manner similar to a jukebox. In a typical car stereo system, a car stereo unit interfaces directly with a CD-changer through an appropriate cable linking the two units. In accordance with a preferred embodiment of the present invention, emulator unit 206 resides as an intermediary unit between car stereo unit 202 and CD-changer unit 204. Emulator unit 206 interfaces and communicates with both the car stereo unit and the CD-changer unit. In addition, emulator unit 206 contains digital audio files 212 that may be accessed by a user through car stereo unit 202 in which digital audio files 212 are organized as virtual CD-ROMs, as explained in more detail further below.

These units may be linked through a variety of communication links. Physical cables may be used to connect the emulator unit with the car stereo/base unit and/or the CD-changer unit. Alternatively, a wireless communication link may be used, such as infrared, Bluetooth™, or some type of wireless personal area network, and the choice of communication link may depend on the deployed environment and the form factors of one or more of the units. In a typical car stereo, a CD-changer unit is kept in the trunk of a vehicle because the CD-changer unit may be relatively large and not easily hidden in a glovebox or under a seat. The emulator unit of the present invention may be implemented in a variety of form factors so that it may be located in a variety of positions within a vehicle. In the example of interfacing with a car stereo unit, the emulator unit might be incorporated into a dashboard, or the emulator unit might be connected to a CD-changer unit and collocated with the CD-changer unit. Alternatively, the emulator unit may be positioned in an independent docking station that accepts portable electronics, possibly in a standard manner such that the docking station also accepts other types of MP3 players. When the docking station does not contain an emulator unit, however, the base unit and the CD-changer unit may continue to function cooperatively. As another alternative, the emulator unit of the present invention may be physically coupled with the base unit or the CD-changer unit through electronic contact rather than by wire or wireless communication links. Again, those of ordinary skill in the art will appreciate that the hardware and software that are used to support the present invention may vary depending on the system implementation.

The manner in which the emulator unit operates to enhance the car stereo system by adding the functionality of storing and playing digital audio files in softcopy format is described in more detail in the following figures.

Figure 3:
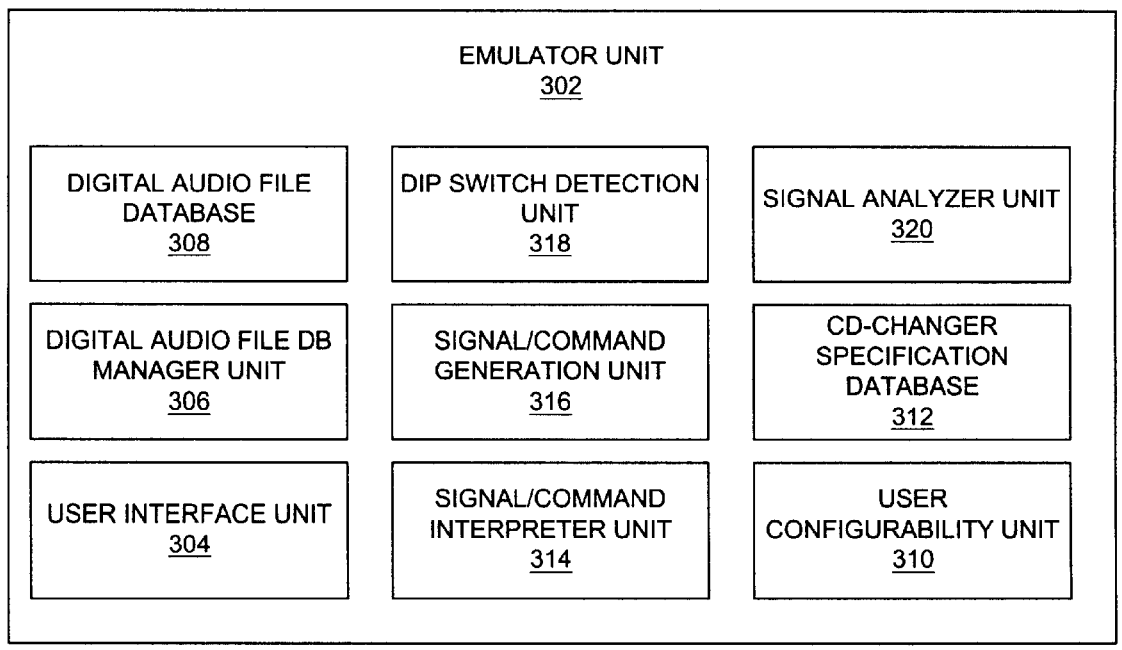
FIG. 3 is a block diagram depicting functional units that may be incorporated into a digital audio storage and CD-changer emulator unit in accordance with a preferred embodiment of the present invention.

With reference now to FIG. 3, a block diagram depicts functional units that may be incorporated into a digital audio storage and CD-changer emulator unit in accordance with a preferred embodiment of the present invention. Emulator unit 302 contains user interface unit 304, which enables user input into the emulator unit in various manners.

In a preferred embodiment, the present invention is a portable device, so the emulator unit may contain a user interface similar to interfaces found on other types of commercially available, portable, digital audio devices. The user interface unit interprets user selection of physical controls on the exterior of the emulator unit, such as "Play", "Rewind", "Fast Forward", "Shuffle", "Playlists", etc. In addition, the emulator unit may contain a standard CD slot for accepting one or more CDs directly into the emulator unit, and the emulator unit may contain other components for accepting other types of physical media, such as cassette tapes, etc. Alternatively, the emulator unit may not have an exterior user interface and is only controlled electronically through another device.

The emulator unit may also physically interface with a personal computer through a variety of means, such as a docking station or with direct connections like serial, Universal Serial Bus (USB), or parallel I/O connections, in a manner similar to that found on other types of commercially available portable digital audio devices. The user interface unit can accept and interpret commands received from an external device that directs the operation of the emulator unit. For example, user interface unit 304 can accept a command directing the emulator unit to store digital audio files in the emulator device, in which case user interface unit 304 operates in conjunction with digital audio file database manager unit 306 to allocate space and store the downloaded files in digital audio file database 308. Examples of the types of digital audio files that may be stored within the emulator unit include, without limitation, ".WAV",".WMA",".AU", ".MIDI",".VOC", ".MP2",and ".MP3" formatted files.

User interface unit 304 also accepts commands to configure emulator unit 302, in which case user interface unit 304 operates in conjunction with user configurability unit 310 to set certain operational parameters or modes within emulator unit 302 that direct emulator unit 302 to operate in a particular manner. The operational parameters may be stored in either flash ROM, RAM, or other memory media as necessary. The functionality of the emulator unit may be accomplished through a variety of hardware and software within the emulator unit. The software may be stored in a combination of ROM and RAM and may be updated with newer versions of software.

While the emulator unit of the present invention may operate with some functions similar to that of many commercially available portable digital audio devices, the emulator unit also provides additional functionality by taking advantage of the interface between stereo units and CD-changer units to implement a methodology for providing access to softcopy digital audio files.

CD-changer specification database 312 contains operational information about various models of CD-changer units and the manner in which emulator unit 302 can interface with a particular type of CD-changer unit. User interface unit 304 may receive commands that direct user configurability unit 310 to update or retrieve information within CD-changer specification database 312. A user may control a selection of a particular type of CD-changer unit, after which the emulator unit operates in a particular manner that is compatible with the CD-changer to which the emulator unit is connected.

By selecting a CD-changer in this manner, signal/command interpreter unit 314 can detect specific control indications from the car stereo unit or base unit. The control indications may be in a variety of forms, such as analog signals, digital signals, digital commands, etc. In a conventional stereo system, signals or commands are sent directly from the base unit to the CD-changer unit. In the present invention, the user can instruct the emulator unit that it is connected to a particular type of CD-changer unit, and the emulator unit can monitor its connection with the base unit for signals or commands of a certain type as stored within the CD-changer specification database in association with the selected type of CD-changer.

In a similar manner, signal/command generation unit 316 can generate specific signals/commands and data to be returned to the car stereo unit or base unit. In a conventional stereo system, data is sent directly to the base unit from the CD-changer unit. In the present invention, the user can instruct the emulator unit that it is connected to a particular type of CD-changer unit, and the emulator unit can generate data in the necessary format to be sent to the base unit via its connection with the base unit as stored within the CD-changer specification database in association with the selected type of CD-changer.

The emulator unit is capable of operating in a variety of different modes: pass-thru mode; end-unit mode; combination mode; and learning mode. The pass-thru mode may operate in two manners. In a first manner, the emulator unit merely receives and forwards commands from the base unit to the CD-changer unit and also receives and forwards data from the CD-changer unit to the base unit. In a second manner, the emulator unit may listen for commands from the base unit but otherwise merely acts as a bus for transferring signals back and forth from the base unit to the actual CD-changer unit.

In the end-unit mode, the emulator unit replaces the CD-changer unit entirely and emulates the presence of a CD-changer unit. Digital audio files are collected from many sources and are organized in a variety of ways, such as genre of music, artist, etc. The emulator unit allows a user, through the appropriate user interface, to organize the digital audio file database in a variety of manners, such as by grouping the files by directory or folder. However, the emulator unit also provides a manner in which the user can organize the digital audio files as virtual CDs, and this organizational information is also stored within digital audio file database 308. In other words, the emulator unit provides multiple ways for a user to map tracks, which are stored as digital audio files within the emulator unit, from the database to virtual CDs. If the emulator unit also provides a component for receiving physical media directly, the emulator unit can also scramble the tracks on the physical media so that those tracks are also mapped to virtual CDs. In the end-unit mode, the emulator unit accepts commands from the base unit and retrieves the requested digital data, whether the data is merely a listing of tracks on virtual CDs or actual digital audio data. The data is then returned to the base unit. The base unit is unaware that the CD-changer does not exist and, in essence, thinks that it is actually communicating with an emulator unit.

In a combination mode, the emulator unit is physically connected between the base unit and the CD-changer unit, as shown in FIG. 2, but the emulator unit works in conjunction with the CD-changer unit. The emulator unit still maps tracks, which are stored as digital audio files within the emulator unit, from the database to virtual CDs or from a direct physical media to virtual CDs. However, the emulator may also read tracks and track information from the actual CD-changer unit by generating and sending appropriate commands to the actual CD-changer unit, as informed by the CD-changer specification database. In this manner, digital audio files on actual CDs within the CD-changer unit can be combined with digital audio files stored in the emulator unit to create virtual CDs with tracks from both sources. The emulator unit can also cache tracks that have already been read from the CDs in the CD-changer unit so that the CDs do not need to be read repeatedly.

As the user presses controls on the base unit for changing CDs or for obtaining information about CDs, the base unit generates commands for a CD-changer unit. However, unbeknownst to the base unit, the emulator unit captures the CD-changer commands and performs the appropriate processing. The emulator unit returns digital audio data and information about CDs and tracks in a manner expected by the base unit.

While allowing the user to specify a type of CD-changer through a user interface provides the most general and flexible manner of ensuring compatibility between the emulator unit and the base and CD-changer units, other manners may also be provided, either in alternate form or in conjunction with the manner described above. Hence, emulator unit 302 may also operate in a learning mode, which may be invoked either by the user through the user interface or possibly automatically upon power-up or boot-up.

As a first alternative manner of selecting a CD-changer unit with which the emulator unit will be interfaced, before deploying the emulator unit, a user may set a series of dual in-line package (DIP) switches. DIP switch detection unit 318 reads the selection of the DIP switches; each particular selection corresponds to a particular type of CD-changer to be emulated. Information about the particular type of CD-changer, such as the format of its commands or signals to and from the CD-changer, is stored in CD-changer specification database 312, either in a ROM (preferably upgradeable) or in a RAM or flash ROM by downloading the needed information from another device. It may be assumed that setting DIP switches is not very inconvenient since a user would not have many CD-changer units. Once the DIP switches settings are detected, the emulator unit may store this information as an operational parameter so that the DIP switches do not have to be read repeatedly.

As a second alternative manner of selecting a CD-changer unit, the emulator unit may actively sense the type of CD-changer that it should emulate. Signal analyzer unit 320 may sense the signals that the emulator unit receives from the base unit and then determine a make or model of CD-changer with which the base unit is trying to communicate. Once the type of CD-changer is detected, the emulator unit may store this information as an operational parameter so that the determination does not need to be performed repeatedly. Again, once the type of CD-changer is detected, information about the particular type of CD-changer, such as the format of its commands or signals to and from the CD-changer, can be accessed from the CD-changer specification database 312.

For example, after the emulator unit is connected to the base unit, the base unit might send certain signals across each line or pin of the connecting cable. The voltage values, patterns of the signals, and number and subset of pins that are used may be different for each type of base unit. In one scenario, base unit A might generate a 0.3 volt pulse every 0.4 seconds on pin #1 for three seconds after the user presses a stop control on the base unit, and base unit B might generate a 0.2 volt pulse every 0.2 seconds on pin #5 for five seconds after the user presses an eject control on the base unit. These patterns may provide a clear indication of the type of CD-changer with which the base unit is attempting to communicate, or alternatively, may provide an indication of the type of base unit, CD player, stereo unit, etc., that generated the signals, which in turn provides an indication of the type of CD-changer. The emulator unit can perform an analog-to-digital conversion on the signals, and by comparing the received signals with potential patterns that were previously stored within the emulator unit, such as in CD-changer unit specification database 312, the emulator unit can determine the type of CD-changer with which the base unit is attempting to communicate.

Figure 4:
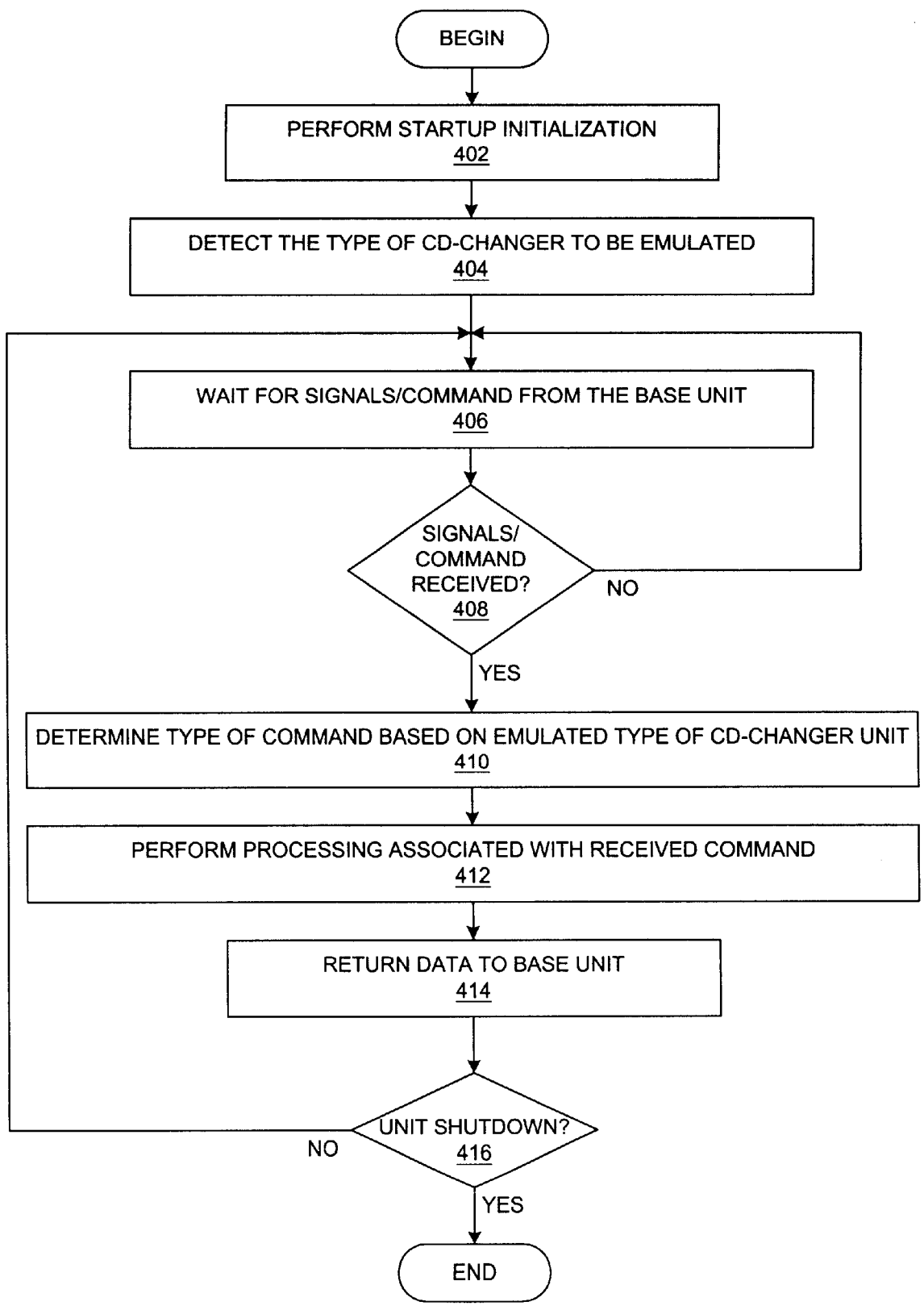
FIG. 4 is a flowchart showing some of the processing that may be performed by a digital audio file storage and CD-emulator unit in accordance with a preferred embodiment of the present invention.

With reference now to FIG. 4, a flowchart shows some of the processing that may be performed by a digital audio file storage and CD-changer emulator unit in accordance with a preferred embodiment of the present invention. The process begins when the emulator unit performs a startup initialization (step 402). The emulator unit then detects the type of CD-changer to be emulated (step 404). As noted above, the emulator unit may be instructed about the type of CD-changer to be emulated, or the CD-changer may detect the type of CD-changer to be emulated. The emulator then waits for a signal or set of signals from the base unit (step 406). A wait loop may be used in which a determination is made as to whether a signal or command has been received (step 408). If so, then the process continues. If not, then the process branches back to step 406 to wait for a signal or command.

At some point in time, the emulator receives one or more signals from the base unit, and the emulator determines the type of command represented by the pattern of signals based upon the previously selected CD-changer to be emulated (step 410). The emulator unit then performs the appropriate processing associated with the received command (step 412), such as returning digital audio data from a particular track of a particular virtual CD or returning track information to the base unit (step 414).

A determination is made as to whether the emulator unit is to be shutdown (step 416), and if not then the process branches back to wait for another command; otherwise, the emulator performs a shutdown process. In other words, the process is essentially a non-terminating loop until the process is completed.

The advantages of the present invention should be apparent in view of the detailed description of the invention that is provided above. The present invention emulates a CD-changer unit while also storing digital audio data in a plurality of softcopy formats. The stored digital audio data can be organized as virtual CD-ROMs. Many different types of CD-changer units are commercially available, and these CD-changer units can only be operated with certain types of audio components or units. By emulating the operations of multiple types of CD-changer units, the present invention enables a single digital audio device to be inserted in many different configurations of digital audio systems. The present invention thereby extends the functionality of a digital audio system to include storage of softcopy digital audio files that may be accessed through controls and commands for a CD-changer unit.

With the ability to load digital audio files onto the CD-changer emulator unit of the present invention, one can extend one's library of CD-ROMs with additional audio files so that one may organize tracks from the CD-ROMs and tracks from the additional audio files into virtual CDs that are then accessible from a base unit that has only CD-changer controls. The emulator unit may store information that allows the tracks of the CD-ROMs, which are physically stored within the CD-changer unit, to be organized into various directories or folders on the emulator unit in combination with the digital audio files stored as softcopy files on the emulator unit. The user may then select from the tracks using the CD-changer controls on the base unit; since all of the tracks appear to be actual CDs to the base unit, the user can use the controls of the stereo unit to move between tracks, shuffle tracks, play random tracks, etc., and the emulator unit interprets the CD-changer control signals from the base unit to retrieve the digital audio data from the proper CD track or softcopy file and to send the digital audio data to the base unit from among the virtual CDs. Hence, without physically replacing the base unit, the user can manipulate virtual CDs with the CD-changer controls of the base unit while also having the additional functionality of portable digital audio files. If the emulator unit is constructed in the appropriate form factor, the emulator unit may be also used as a stand-alone, portable, digital audio player.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for operating a data processing system in a digital audio system, wherein the data processing system stores configurable information that is used during the operation of the data processing system, the method comprising the steps of:

storing a plurality of digital audio files in a database within the data processing system, wherein the plurality of digital audio files represents one or more virtual tracks of one or more virtual CDs (Compact Disks);

receiving a signal at the data processing system from a requesting unit;

interpreting the received signal as a control signal for a configured type of CD-changer unit, wherein the data processing system stores configurable information for the emulation of operations in multiple configured types of CD-changer units;

determining a CD-changer unit operation that corresponds to the control signal, wherein the determined CD-changer unit operation would be performed by an instance of the configured type of CD-changer unit in response to an instance of the configured type of CD-changer unit receiving the control signal; and emulating the determined CD-changer unit operation within the data processing system, the emulating step further comprising:

determining a virtual CD identifier and a virtual track identifier targeted by the determined CD-changer unit operation;

mapping the determined virtual CD identifier and the determined virtual track identifier to a digital audio file stored within the database as a virtual track of a virtual CD; and returning digital audio data from the mapped digital audio file to the requesting unit.

2. The method of claim 1 further comprising:
selecting a type of CD-changer unit to be emulated by the data processing system.

3. The method of claim 2 further comprising:
detecting a control signal for a CD-changer unit; and
automatically selecting the type of CD-changer unit to be emulated by the data processing system based on the detected control signal.

4. The method of claim 2 further comprising:
receiving a user selection for selecting a type of CD-changer unit to be emulated by the data processing system.

5. The method of claim 1 wherein the received signal is an analog signal, a digital signal, or a digital command.

6. A data processing system for processing digital audio data, wherein the data processing system stores configurable information that is used during the operation of the data processing system, the data processing system comprising:

storing means for storing a plurality of digital audio files in a database within the data processing system, wherein the plurality of digital audio files represents one or more virtual tracks of one or more virtual CDs (Compact Disks);

first receiving means for receiving a signal at the data processing system from a requesting unit;

interpreting means for interpreting the received signal as a control signal for a configured type of CD-changer unit, wherein the data processing system stores configurable information for the emulation of operations in multiple configured types of CD-charger units;

first determining means for determining a CD-changer unit operation that corresponds to the control signal, wherein the determined CD-changer unit operation would be performed by an instance of the configured type of CD-changer unit in response to an instance of the configured type of CD-changer unit receiving the control signal; and emulating means for emulating the determined CD-changer unit operation within the data processing system, the emulating means further comprising:

means for determining a virtual CD identifier and a virtual track identifier targeted by the determined CD-changer unit operation;

means for mapping the determined virtual CD identifier and the determined virtual track identifier to a digital audio file stored within the database as a virtual track of a virtual CD; and means for returning digital audio data from the mapped digital audio file to the requesting unit.

7. The data processing system of claim 6 further comprising:
first selecting means for selecting a type of CD-changer unit to be emulated by the data processing system.

8. The data processing system of claims 7, wherein the first selecting means further comprises:
detecting means for detecting a control signal for a CD-changer unit; and
second selecting means for automatically selecting the type of CD-changer unit to be emulated by the data processing system based on the detected control signal.

9. The data processing system of claim 7 further comprising:
second receiving means for receiving a user selection for selecting a type of CD-changer unit to be emulated by the data processing system.

10. The data processing system of claim 6 wherein the received signal is an analog signal, a digital signal, or a digital command.

11. A computer program product on a computer readable medium for use in a data processing system for processing digital audio data, wherein the data processing system stores configurable information that is used during the operation of the data processing system, the computer program product comprising:

instructions for storing a plurality of digital audio files in a database within the data processing system, wherein the plurality of digital audio files represents one or more virtual tracks of one or more virtual CDs (Compact Disks);

instructions for receiving a signal at the data processing system from a requesting unit;

instructions for interpreting the received signal as a control signal for a configured type of CD-changer unit, wherein the data processing system stores configurable information for the emulation of operations in multiple configured types of CD-changer units;

instructions for determining a CD-changer unit operation that corresponds to the control signal, wherein the determined CD-changer unit operation would be performed by an instance of the configured type of CD-changer unit in response to an instance of the configured type of CD-changer unit receiving the control signal; and instructions for emulating the determined CD-changer unit operation within the data processing system, the instructions for emulating further comprising:

instructions for determining a virtual CD identifier and a virtual track identifier targeted by the determined CD-changer unit operation;

instructions for mapping the determined virtual CD identifier and the determined virtual track identifier to a digital audio file stored within the database as a virtual track of a virtual CD; and instructions for returning digital audio data from the mapped digital audio file to the requesting unit.

12. The computer program product of claim 11 further comprising:
instructions for selecting a type of CD-changer unit to be emulated by the data processing system.

13. The computer program product of claim 12 further comprising:
   instructions for detecting a control signal for a CD-changer unit; and
   instructions for automatically selecting the type of CD-changer unit to be emulated by the data processing system based on the detected control signal.

14. The computer program product of claim 12 further comprising:
   instructions for receiving a user selection for selecting a type of CD-changer unit to be emulated by the data processing system.

15. The computer program product of claim 11 further comprising:
   instructions for sending track identification information for a digital audio file from the data processing system to the requesting unit for display by the requesting unit, wherein the digital audio file is stored within the data processing system.

16. The computer program product of claim 11 further comprising:
   instructions for relaying track identification information for a digital audio file from a CD-changer unit to the requesting unit for display by the requesting unit, wherein the digital audio file is stored on a CD in the CD-changer unit.

17. The computer program product of claim 11 wherein the received signal is an analog signal, a digital signal, or a digital command.

* * * * *